(12) United States Patent
Hickey

(10) Patent No.: US 11,125,380 B2
(45) Date of Patent: Sep. 21, 2021

(54) MULTI-REMOTE CONTROL HOLDER DEVICE

(71) Applicant: Andrew Hickey, Durham, NC (US)

(72) Inventor: Andrew Hickey, Durham, NC (US)

( * ) Notice: Subject to any disclaimer, the term of this patent is extended or adjusted under 35 U.S.C. 154(b) by 0 days.

(21) Appl. No.: 16/853,129

(22) Filed: Apr. 20, 2020

(65) Prior Publication Data
US 2020/0340618 A1 Oct. 29, 2020

Related U.S. Application Data

(60) Provisional application No. 62/837,792, filed on Apr. 24, 2019.

(51) Int. Cl.
*F16M 13/02* (2006.01)
*F16B 1/00* (2006.01)
*F16B 11/00* (2006.01)

(52) U.S. Cl.
CPC ............... *F16M 13/02* (2013.01); *F16B 1/00* (2013.01); *F16B 11/00* (2013.01); *F16B 2001/0028* (2013.01)

(58) Field of Classification Search
CPC combination set(s) only.
See application file for complete search history.

(56) References Cited

U.S. PATENT DOCUMENTS

| 4,044,980 | A | * | 8/1977 | Cummins | ............ A47B 23/043 248/456 |
|---|---|---|---|---|---|
| 4,660,792 | A | | 4/1987 | Rogalski | |
| 4,709,412 | A | | 11/1987 | Seymour | |
| 4,712,693 | A | | 12/1987 | Striplin | |
| 4,815,683 | A | | 3/1989 | Ferrante | |
| 4,824,059 | A | | 4/1989 | Butler | |
| 4,838,505 | A | | 6/1989 | Lowe | |
| 4,848,609 | A | | 7/1989 | Meghnot | |
| 4,852,746 | A | | 8/1989 | Wells | |
| 4,856,658 | A | | 8/1989 | Novak | |
| 4,991,817 | A | | 2/1991 | VonKleist | |
| 4,991,892 | A | | 2/1991 | Burrell | |
| 5,125,516 | A | | 6/1992 | McKenna | |
| 5,192,042 | A | | 3/1993 | Wotring | |
| 5,195,634 | A | | 3/1993 | Zaug | |
| 5,244,173 | A | | 9/1993 | Kulyk | |
| 5,269,484 | A | * | 12/1993 | Jones | ..................... A47B 45/00 211/26.1 |
| 5,316,249 | A | * | 5/1994 | Anderson | .............. H01H 9/025 211/26.1 |
| 5,341,941 | A | * | 8/1994 | Marlor | ................... A63B 23/14 211/26.1 |
| 5,370,238 | A | | 12/1994 | Czajkowski | |

(Continued)

FOREIGN PATENT DOCUMENTS

| DE | 3603641 A1 | 8/1987 |
|---|---|---|
| DE | 3911294 A1 | 7/1990 |
| GB | 2146813 A | 4/1985 |

*Primary Examiner* — Monica E Millner
(74) *Attorney, Agent, or Firm* — NCCU IP Clinic

(57) ABSTRACT

A portable hand-held device which consolidates a variety of remote control holders enables an operator to use a single device to hold multiple remote controls of different dimensions. Additionally, as the operator acquires more audio and visual components with accompanying remote controls, the multi-remote control holder device is capable to accommodate hold more remote controls.

6 Claims, 4 Drawing Sheets

(56) References Cited

U.S. PATENT DOCUMENTS

| | | | | |
|---|---|---|---|---|
| 5,370,241 | A | | 12/1994 | Silvers |
| 5,605,235 | A | | 2/1997 | Johnson |
| 5,758,972 | A | * | 6/1998 | Mack ..................... A47C 21/00 5/503.1 |
| 5,872,702 | A | | 2/1999 | Kopel |
| 5,954,208 | A | * | 9/1999 | Schultz ................. H01H 9/025 211/13.1 |
| D426,985 | S | * | 6/2000 | Casalino ....................... D6/672 |
| 6,525,268 | B1 | | 2/2003 | Sellers |
| 6,703,962 | B1 | | 3/2004 | Marics |
| 8,469,204 | B1 | * | 6/2013 | Bradshaw .............. F16M 13/00 211/26.1 |
| 2003/0066937 | A1 | * | 4/2003 | Smith .................... F16M 11/22 248/176.1 |
| 2005/0155942 | A1 | * | 7/2005 | Viola .................... H01H 9/025 211/26.1 |
| 2006/0091030 | A1 | * | 5/2006 | Tawanapoor .......... A47G 19/24 206/320 |
| 2012/0012545 | A1 | | 1/2012 | Auslaender |
| 2013/0270417 | A1 | * | 10/2013 | Pemberton ............. F16M 13/00 248/682 |

* cited by examiner

MULTI-REMOTE CONTROL HOLDER DEVICE

CROSS-REFERENCE TO RELATED APPLICATIONS

This application claims the benefit of U.S. Provisional Application No. 62/837,792, filed on Apr. 24, 2019, which is hereby incorporated in its entirety.

FIELD OF THE INVENTION

The present invention is related to remote controls for home entertainment devices, and more particularly to a portable hand-held device used to consolidate and support a plurality of remote controls.

BACKGROUND

The following description is not an admission that any of the information provided herein is prior art or relevant to the present invention, or that any publication specifically or implicitly referenced is prior art. Any publications cited in this description are incorporated by reference herein. Where a definition or use of a term in an incorporated reference is inconsistent or contrary to the definition of that term provided herein, the definition of that term provided herein applies and the definition of that term in the reference does not apply.

For purposes of home entertainment, it is common to have a variety of audio and visual devices which are operated by remote controls without the need for a physical connection between the remote control and the corresponding audio/visual device. Therefore, multiple remote controls are necessary. The task of locating the proper remote control can become increasingly difficult when a user has more than one remote control.

As new electrical devices enter the market, consumers often update their repertoire of devices by purchasing new devices. Each of these devices often has a unique remote control. Therefore, universal remote controls are not the answer to the issue of needing many remote controls, as new technology renders it impossible to maintain one universal remote control that is up-to-date to a user's needs. This is particularly true when use of a singular remote control device may not be compatible with the various brands of entertainment devices and their respective coding systems.

Other issues with current remote control consoles are associated with the ergonomic difficulty in juggling such devices. A remote control that is necessary to operate a desired system can easily get lost, which can negatively affect the user's experience. Remote controls can also easily slip into hard to reach places, thus causing frustration for the user.

Several remote control devices exist in the market that can hold more than one remote control; however, these devices have many deficiencies. For example, U.S. Pat. No. 4,838,505 describes a cylinder-shaped remote control holder that is configured to attach remote controls to its outer circumference. However, this device is not configured to accommodate a variety of remote controls with different shapes and dimensions. Furthermore, the holder device is large and difficult to hold and operate.

U.S. Patent Publication 2012/0012545 describes a remote control collector with an upright support member. The device is not portable and not configured to be easy for a user to hold and manipulate. Furthermore, the device requires a flat surface for the base portion of the collector to stand upright. Similarly, U.S. Pat. Nos. 5,244,173 and 4,712,693 also require a flat surface for stability.

U.S. Pat. No. 4,815,683 discloses a holder for remote controls and other similar devices. This invention, however, is configured to hold remote controls on the side of a television set in a pocket. It is, therefore, not portable and does not allow seamless usage of one remote control after another.

U.S. Pat. No. 4,856,658 details a remote control unit holder assembly in which one unit is configured to hold one remote control, and multiple units can be affixed to one another to comprise the holder. This invention requires the user to purchase multiple units and does not allow the user to easily hold multiple remote controls at once and operate them each in turn. Similarly, U.S. Pat. No. 4,848,259 is configured to only affix two remote controls together.

U.S. Pat. No. 5,125,516 discloses an apparatus for consolidating a variable plurality of remote control devices. The device, however, leaves negative space in each configuration that can compromise the structural stability of the device, thus making manipulation by the user difficult.

U.S. Pat. No. 4,991,892 describes a remote control holder that hangs remote controls off of a central base. The device, however, does not allow the user to easily switch from using one remote control to another by the simple turn of a wrist.

There exists a need for a device which will allow a plurality of remote control units to be conveniently stored, completely operable without risk of inadvertent triggering of the units, and without the need for a base for stability, while also adapting to accommodate more remote control devices as they are acquired and allowing easy removal of a remote control from the device.

SUMMARY OF THE INVENTION

The present invention is directed to a lightweight and inexpensive portable hand-held remote control device that stores a plurality of remote controls such that the remote controls are removably attached to each other on the device. The device comprises a means for attaching the remote controls to each other and to the remote control device by utilizing hook and loop tape that is configured to hold each remote control against a central location, with each remote control facing outwardly.

It is an object of the present invention to hold several remote controls in one location such that the remote controls may be easily operated without removal from the device.

It is a further object of the present invention to provide a device that is configured to accommodate multiple remote control devices as the operator acquires more such devices.

In an embodiment, a multi-remote control holder device comprises a plurality of remote controls each comprising a back surface and a side surface; a plurality of first attachment and second attachment strips; and a central pressure-sensitive adhesive strip, wherein the plurality of first and second attachment strips are removably attached to the back surfaces of the plurality of remote control by the pressure-sensitive adhesive strip.

In a further embodiment, the plurality of first attachment strips and the second attachment strips comprise hook and loop tape material.

In yet another embodiment, the plurality of first attachment strips and the second attachment strips are located on the perpendicular axis of each of the plurality of remote controls.

In still another embodiment, the multi-remote control holder further comprises a protruding hanger attachment.

In one embodiment, a multi-remote control holder device comprises a plurality of remote controls each with a back surface and a side surface; a plurality of strips of first and second attachments to the back surfaces of the plurality of remote controls; a pressure-sensitive adhesive strip of hook and loop tape attached to the side surfaces; wherein each of the remote controls are affixed to the hook and loop tape by the pressure sensitive adhesive strip; and a protruding hanger attachment comprising a piece of fabric with a center flap.

In another embodiment, the protruding hanger attachment is affixed by a hook and loop tape to the remote control device.

In an embodiment, the protruding hanger attachment is readily affixable to any prepared surface.

Various objects, features, aspects and advantages of the inventive subject matter will become more apparent from the following detailed description of exemplary embodiments, along with the accompanying figures in which like numerals represent like components.

DETAILED DESCRIPTION

A multi-remote control holder device can hold at least two remote controls of different sizes and weight, and allow for an adjustment to accommodate additional remote controls.

Further, as used herein, and unless the context dictates otherwise, the term "multi remote control holder device" and "device" are used synonymously. As used herein, and unless the context dictates otherwise, the term "prepared surface" is intended to include a table surface, shelf surface, surface on the back of the television, or any flat surface.

As used in the description herein and throughout the claims that follow, the meaning of "a," "an," and "the" includes plural reference unless the context clearly dictates otherwise. Also, as used in the description herein, the meaning of "in" includes "into" and "on" unless the context clearly dictates otherwise.

As used herein, the term "about" in conjunction with a numeral refers to a range of that numeral starting from 10% below the absolute of the numeral to 10% above the absolute of the numeral, inclusive.

Figure 1:
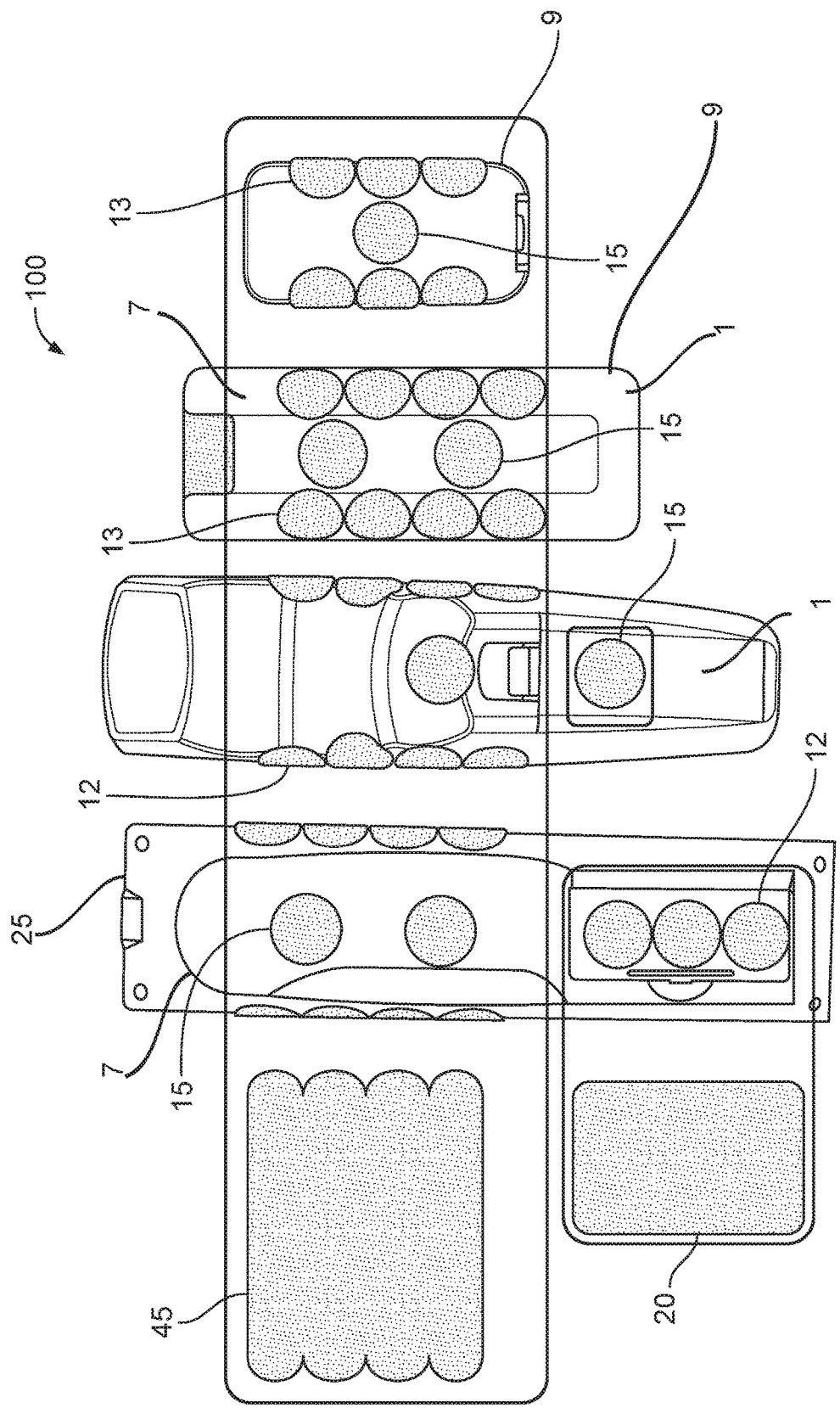
FIG. 1 is an exploded view of an exemplary configuration of a multi-remote control holder device.
Figure 2:
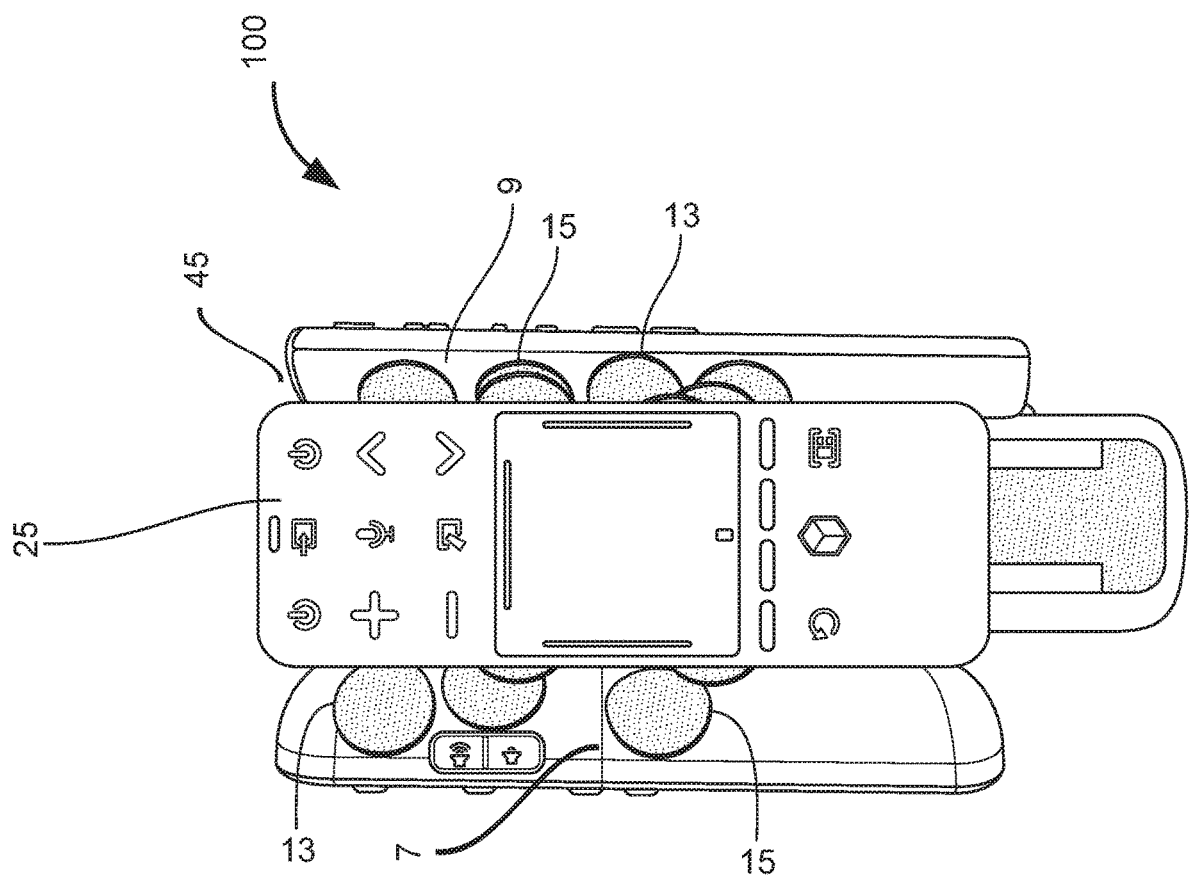
FIG. 2 is lateral view of an exemplary configuration of a multi-remote control holder device.
Figure 3:
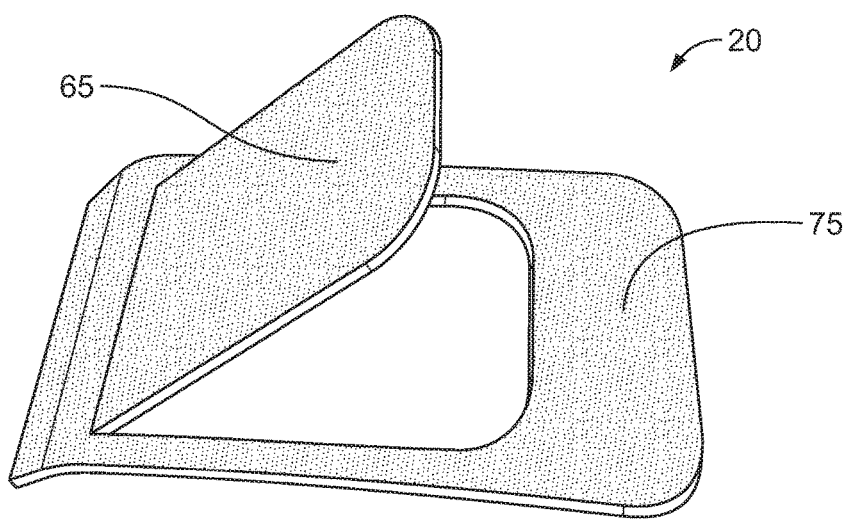
FIG. 3 is an exemplary configuration of the multi-remote control holder device hanger attachment.
Figure 4:
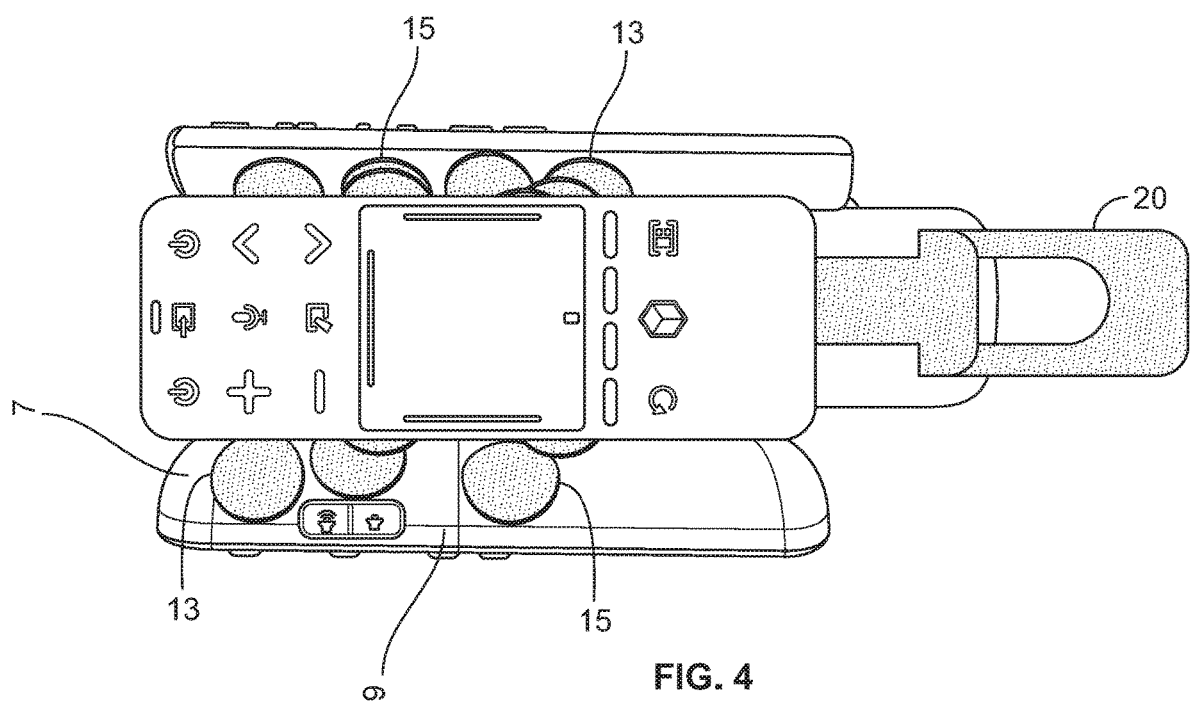
FIG. 4 is an exemplary configuration of a multi-remote control holder device according to the present invention, which depicts the hanger attachment.
Figure 5:
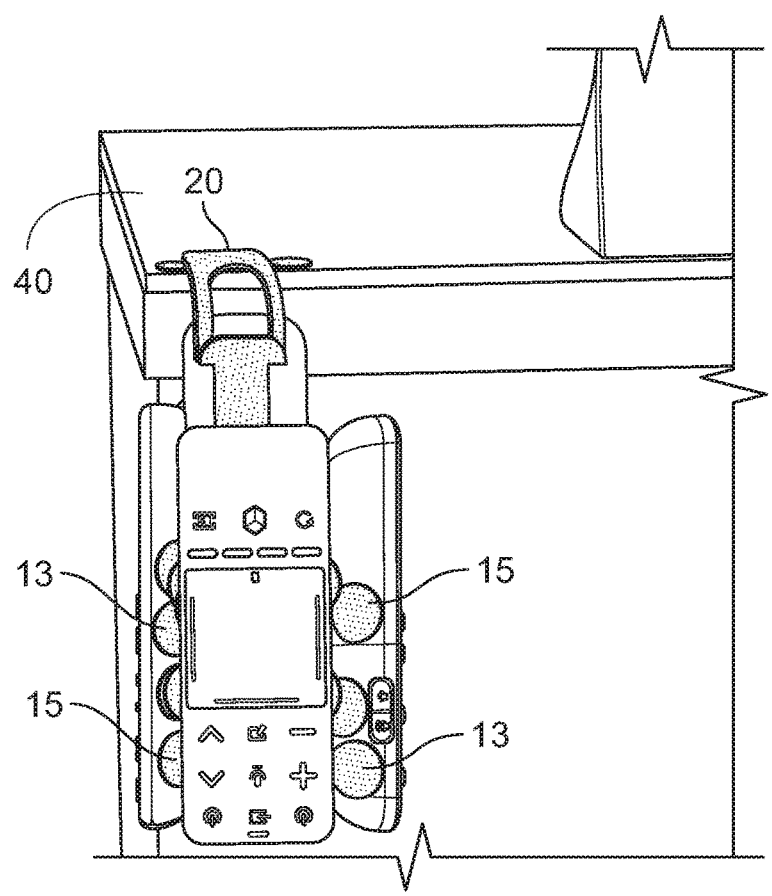
FIG. 5 is an exemplary configuration of a multi-remote control holder device according to the present invention, which depicts the hanger attachment affixed to a prepared surface.
Figure 6:
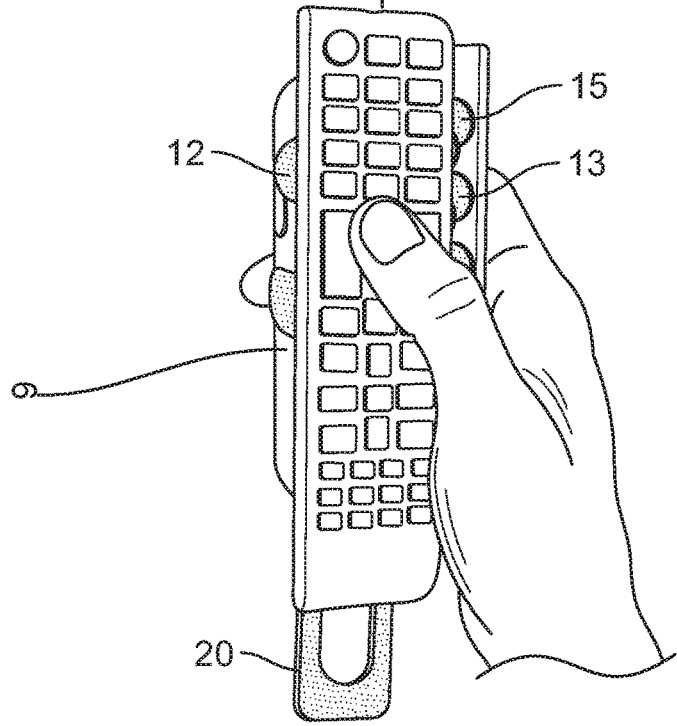
FIG. 6 depicts an exemplary configuration of a multi-remote control holder device according to the present invention being held in a user's hand.

Exemplary configurations are schematically depicted in FIGS. 1-6, in which multi-remote control holder device 100 is designed and adapted for use and attachment of plurality of remote controls 1 to prepared surface 40. In an exemplary embodiment, multi-remote control holder device 100 includes plurality of remote controls 1, plurality of first attachment strips 13 and plurality of second attachment strips 15 with pressure-sensitive adhesive 12 (not shown) on side (not shown) of each first attachment strip 13 and second attachment strip 15 facing plurality of remote controls 1 (see FIG. 1). In an embodiment, first attachment strip 13 and second attachment strip 15 are removably affixed to back surface 7 of remote control 25 with pressure-sensitive adhesive 12. This configuration is achieved through the use of plurality of first attachment strips 13 and second attachment strips 15 that are placed on the perpendicular axis of each remote control 25 by central attachment strip 45, and are oriented diagonally alongside surface 9 of each remote control 25 to ensure that each attachment strip 45 is taut to prevent sliding of each remote control 25.

In yet another embodiment (not shown), center cylinder 18 is configured to removably attach to plurality of first attachment strips 13 and second attachment strips 15 that are affixed to back surface 7 of each remote control 25 (not shown). In one embodiment, device 100 contains hanger component 20 that is configured to be secured to bottom surface 25 of the largest of plurality of remote controls 1 through use of first attachment strip 13 and second attachment strip 15 (see FIG. 4). In another embodiment (not shown), a triggering beam is exposed allowing plurality of remote controls 1 to interface with devices they control (not shown).

In one embodiment, multi-remote control holder device 100 is manufactured using first attachment strip 13 and second attachment strip 15, which is removably attached to back surface 7 of each remote control 25 using pressure sensitive adhesive 12, thus allowing the operator to consolidate the remote controls to one central location. In this embodiment, first attachment strip 13 or second attachment strip 15 is configured into central attachment strip 45 and removably attached to back surface 7 of plurality of remote controls 1 which runs parallel to the axis of plurality of remote controls 1 to connect to prepared surface 40 (see FIG. 5). In one embodiment, device 100 is configured to allow a user to easily use different remote controls in succession by rotating device 100 in one's hand (see FIG. 6).

In an exemplary embodiment, the material of construction for first attachment strip 13 and second attachment strip 15 is a flexible and strong material that can be affixed to most surfaces using pressure sensitive adhesive 12. In another exemplary embodiment, the material of construction for pressure sensitive adhesive 12 is glue or any suitable adhesive material. In an exemplary embodiment, the material of construction for first attachment strip 13 and second attachment strip 15 is hook and loop tape.

In one embodiment, multi-remote control holder device 100 is designed to retain four remote controls. Back surface 7 of each remote control 25 is removably attached to the other remotes with using multiple sets of first attachment strip 13 and second attachment strip 15, with each set comprising two strips of first attachment 13 and second attachment 15, which is removably attached perpendicularly to center cylinder 18 (not shown) of rolled loop tape or hook tape (not shown) or central strip 45. The perpendicular sets of first attachment strip 13 are located at the top end, bottom end, and middle of center cylinder 18 (not shown) for a total of twelve sets of first attachment strip 13 and second attachment strip 15 (see FIG. 2-3).

In an exemplary embodiment, multi-remote control holder device 100 is configured with hanger attachment 20 to readily attach device 100 to prepared surface 40 (see FIG.

5). Hanger attachment 20 comprises rectangular piece of fabric 75 with center flap 65 which is affixed to multi-remote control holder device 100 by a plurality of first attachment strip 13 and second attachment strip 15. In this embodiment, first attachment strip 13 and second attachment strip 15 (not shown) are affixed to prepared surface 40.

Thus, specific embodiments of a multi-remote control holder device and methods to employ such device have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A multi-remote control holder device comprising:
   (a) a plurality of remote controls each comprising a back surface and a side surface;
   (b) a plurality of first attachment and second attachment strips, and
   (c) a central strip,
   wherein:
   i. said plurality of said first and second attachment strips are removably attached to said back surfaces of said plurality of remote controls so that said back surface of each of said remote controls is removably attached to said back surface of said other remote controls
   ii. each set of two strips of first attachment and second attachment strips are removably attached perpendicularly to said central strip; and
   iii. said device is configured to allow a user to use said plurality of remote controls in succession by rotating said device.

2. The multi-remote control holder device as recited in claim 1, wherein said plurality of first attachment strips and said second attachment strips comprise hook and loop tape material.

3. The multi-remote control holder device as recited in claim 1, wherein said multi-remote-control holder further comprises a protruding hanger attachment.

4. A multi-remote control holder device comprising:
   (a) a plurality of remote controls each comprising a back surface and a side surface;
   (b) a plurality of strips of first and second attachments removably attached to said back surfaces of said plurality of remote controls, so that the back surfaces of said plurality of remote controls are removably attached to each other;
   (c) a central strip of hook and loop tape attached to said side surfaces; wherein each of said remote controls is affixed to said hook and loop tape by said central strip; and
   (d) a protruding hanger attachment comprising a piece of fabric with a center flap,
   wherein said device is configured to allow a user to use said plurality of remote controls in succession by rotating said device.

5. The multi-remote control holder device as recited in claim 4, wherein said protruding hanger attachment is affixed by said hook and loop tape to said remote control device.

6. The multi-remote control holder device as recited in claim 4, wherein said protruding hanger attachment is readily affixable to any prepared surface.

* * * * *